United States Patent
Brion, Jr.

(10) Patent No.: US 10,025,794 B2
(45) Date of Patent: Jul. 17, 2018

(54) METHODS AND SYSTEMS FOR MANAGING AND QUERYING A JOURNALING-CAPABLE FILE SYSTEM

(71) Applicant: Iseries Solutions, LLC, Lincoln, NE (US)

(72) Inventor: Ronald Richard Brion, Jr., Lincoln, NE (US)

(73) Assignee: ISeries Solutions, LLC, Lincoln, NE (US)

( * ) Notice: Subject to any disclaimer, the term of this patent is extended or adjusted under 35 U.S.C. 154(b) by 596 days.

(21) Appl. No.: 13/916,935

(22) Filed: Jun. 13, 2013

(65) Prior Publication Data

US 2014/0372380 A1    Dec. 18, 2014

(51) Int. Cl.
    *G06F 17/30*    (2006.01)

(52) U.S. Cl.
    CPC .............................. *G06F 17/30191* (2013.01)

(58) Field of Classification Search
    CPC .. G06F 21/80; G06F 2221/2143; G06F 3/122; G06F 3/126; G06F 3/1279; G06F 11/00; G06F 11/30; G06F 17/30144; G06F 17/30191; G06F 17/30212; G06F 17/30572; G06F 8/30; G06F 9/45508; G06F 9/45512; G06F 9/541; G06F 17/2247; G11B 5/024; G11B 5/86; G06K 15/181; G06Q 40/12; G06Q 40/02
    See application file for complete search history.

(56) References Cited

U.S. PATENT DOCUMENTS

| | | | |
|---|---|---|---|
| 6,021,414 A | 2/2000 | Fuller | |
| 6,941,322 B2 | 9/2005 | Bills et al. | |
| 7,552,150 B2 | 6/2009 | Olson | |
| 7,650,475 B2 | 1/2010 | Suzuki et al. | |
| 8,892,503 B1 * | 11/2014 | Shah et al. | 707/601 |
| 2009/0112888 A1 * | 4/2009 | Warsaw | G06F 8/34 |
| 2012/0072465 A1 * | 3/2012 | McGowan | G06F 17/30289 |
| | | | 707/803 |
| 2012/0304303 A1 * | 11/2012 | Leithead et al. | 726/26 |

* cited by examiner

*Primary Examiner* — Dinku Gebresenbet
(74) *Attorney, Agent, or Firm* — Armstrong Teasdale LLP

(57) ABSTRACT

A method for managing a journaling-capable file system is implemented by a computing device including a processor and a memory coupled to the processor. The memory includes a set of meta commands, a set of standard journaling commands, and a journaling-capable file system that is responsive to the set of standard journaling commands. Each meta command corresponds to at least one of the standard journaling commands. The method includes receiving a first meta command wherein the first meta command corresponds to a first plurality of the standard journaling commands, converting the first meta command to the first plurality of standard journaling commands, and executing the first plurality of standard journaling commands to perform at least one operation on the journaling-capable file system.

17 Claims, 12 Drawing Sheets

METHODS AND SYSTEMS FOR MANAGING AND QUERYING A JOURNALING-CAPABLE FILE SYSTEM

BACKGROUND OF THE INVENTION

The field of the invention relates generally to journaling-capable file systems and, more particularly, to systems and methods for managing and querying journaling-capable file systems.

At least some known journaling-capable file systems require user interaction to manage and interact with the file systems. Such interaction may require significant experience and training by users. Additionally, such interaction may take significant time to execute, particularly for newer users.

BRIEF DESCRIPTION OF THE INVENTION

In one aspect, a method for managing a journaling-capable file system is provided. The method is implemented by a computing device including a processor and a memory coupled to the processor. The memory includes a set of meta commands, a set of standard journaling commands, and a journaling-capable file system that is responsive to the set of standard journaling commands. Each meta command corresponds to at least one of the standard journaling commands The method includes receiving a first meta command wherein the first meta command corresponds to a first plurality of the standard journaling commands, converting the first meta command to the first plurality of standard journaling commands, and executing the first plurality of standard journaling commands to perform at least one operation on the journaling-capable file system.

In another aspect, one or more non-transitory computer-readable storage media for managing a journaling-capable file system is provided. The one or more non-transitory computer-readable storage media have computer-executable instructions embodied thereon. When executed by at least one processor, the computer-executable instructions cause the processor to receive a first meta command wherein the first meta command corresponds to a first plurality of the standard journaling commands, convert the first meta command to the first plurality of standard journaling commands, and execute the first plurality of standard journaling commands to perform at least one operation on a journaling-capable file system.

In a further aspect, a computer for managing a journaling-capable file system is provided. The computer includes a processor and a memory device coupled to the processor. The computer is configured to receive a first meta command wherein the first meta command corresponds to a first plurality of the standard journaling commands, convert the first meta command to the first plurality of standard journaling commands, and execute the first plurality of standard journaling commands to perform at least one operation on a journaling-capable file system.

BRIEF DESCRIPTION OF THE DRAWINGS

The Figures listed below show example embodiments of the methods and systems described herein.

Figure 1:
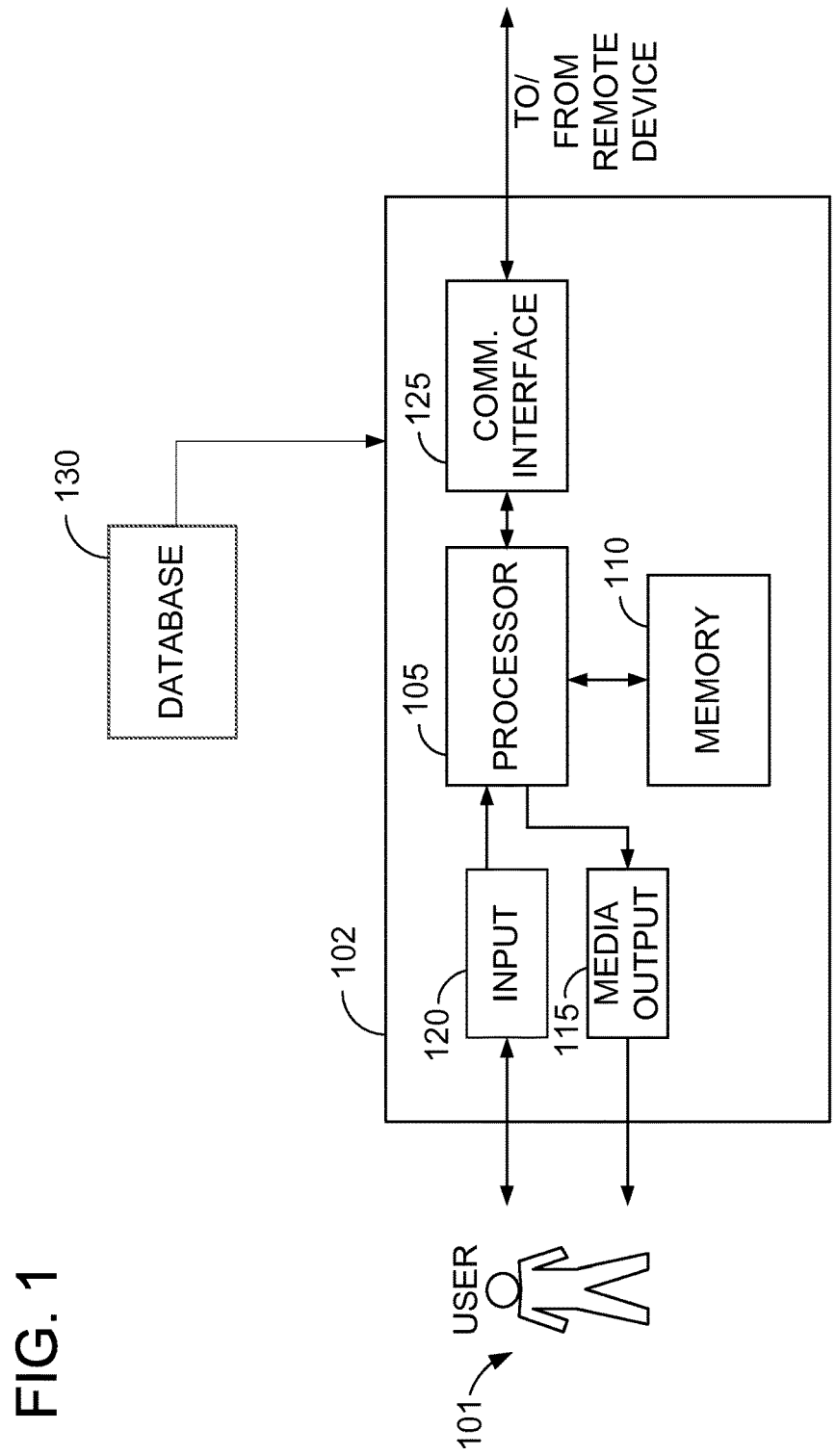
FIG. 1 is a simplified block diagram of an example embodiment of a user system for managing and querying journaling-capable file systems in accordance with one embodiment of the present invention.

Although specific features of various embodiments may be shown in some drawings and not in others, this is for convenience only. Any feature of any drawing may be referenced and/or claimed in combination with any feature of any other drawing.

DETAILED DESCRIPTION OF THE INVENTION

The following detailed description of implementations refers to the accompanying drawings. The same reference numbers in different drawings may identify the same or similar elements. Also, the following detailed description does not limit the claims.

This subject matter described herein relates generally to journaling-capable file systems and, more specifically, systems and methods for managing and querying journaling-capable file systems.

In many computing environments, journaling-capable file systems may be utilized to mitigate risks posed by interrupting events (e.g., power failures, network failures, and system crashes) that occur between file writes. In the absence of journaling, as used in a journaling-capable file system, an interrupting event can cause significant problems. For example, if a user seeks to delete a file, the file system typically must remove the directory entry for the file and then mark the space for the file and its Mode as free in the free space map. If an interrupting event occurs after the directory entry is removed but before the space is marked free, there will be an orphaned Mode which create a storage leak. More generally, interrupting events occurring between file writes can lead to inconsistencies in the file system. Inconsistencies can prevent the file system from being mounted for read-write access. Although inconsistencies can be detected in the absence of journaling, detection and recovery are time consuming Resultantly, the inconsistencies which may be caused by an interrupting event can lead to significant system downtime.

Journaling-capable file systems rectify this problem by creating a journal which records all intended file writes before the file writes are committed. Therefore, if an interrupting event occurs, the file system can simply use the journal to "replay" the file writes which need to occur. After such a replay, the file system can be assured of consistency. Entries in the journal are noted as successfully written after a file system write is executed. Therefore the journal contains information about whether its change entries have been committed or not. Additionally, in the event that an entry to the journal itself is incomplete, the file system will typically skip replaying such an entry after an interrupting event.

Although journaling-capable file systems are very useful to users of systems where file consistency and uptime are valuable, journaling-capable file systems may be difficult to use and administrate. In many cases, the journaling-capable file systems require significant knowledge of detailed commands. Additionally, the granularity of commands in a journaling-capable file system may make some tasks difficult to execute because they require executing many distinct commands.

Systems and methods used to manage and query journaling-capable file systems may yield a variety of additional benefits beyond ensuring consistency in the file system. For example, systems and methods described herein may be used to audit the use of a file system and determine how a particular file was changed, when a particular file was changed, and identify a user profile associated with changing the file. Auditing may be useful to view the entire history of a particular file and determine if changes were valid. Accordingly, such auditing may help identify fraudulent, erroneous, and valid activity.

The systems and methods described herein allow for managing and querying journaling-capable file systems so that a user may take advantage of the benefits of a journaling-capable file system without the constraints of using the toolsets of most journaling-capable file systems. A user can utilize an interface and provide meta commands to the system which each represents one or more standard journaling commands for the journaling-capable file system. For example, the system and method are able to convert a first meta command to a corresponding first plurality of standard journaling commands. In some cases a meta command may correspond to a single standard journaling command. The system and method are able to convert the first meta command to a corresponding first plurality of standard journaling commands by using an internal mapping schema which relates meta commands to standard journaling commands The system and method then execute the first plurality of standard journaling commands to perform at least one operation on the journaling-capable file system. The meta commands may include a variety of command types including, without limitation, generating a journal receiver, deleting a journal receiver, generating a journal, deleting a journal, querying a journal receiver, displaying an output based upon a journal receiver to a display, printing a report of output based upon a journal receiver, and writing an output based on a journal receiver to a file. In some implementations, the meta commands can further be set to run by using a user-defined schedule and/or conditional rules. More specifically, in some implementations the meta commands will only execute when a scheduled event occurs and/or when conditions regarding the commands and/or journals are satisfied. Additionally, the user can additionally use some implementations of the system to view a representation of the journaling-capable file system and options for the meta commands. Some implementations of the system and method may additionally include using an application programming interface ('API') to execute operations on the journaling-capable file system. Example systems and methods may also include using a scripting engine to execute operations on the journaling-capable file system.

Described in detail herein are example embodiments of systems and methods for managing a journaling-capable file system. A technical effect of the systems and methods described herein include at least one of (a) more efficient querying of journaling-capable file systems; (b) more efficient management of journaling-capable file systems; and (c) increased system uptime caused by more efficient utilization of journaling-capable file systems.

More specifically, the technical effects can be achieved by performing at least one of the following steps: (a) receiving a first meta command wherein the first meta command corresponds to a first plurality of the standard journaling commands; (b) converting the first meta command to the first plurality of standard journaling commands; (c) executing the first plurality of standard journaling commands to perform at least one operation on the journaling-capable file system; (d) receiving a first meta command that pertains to at least one of generating a journal receiver, deleting a journal receiver, generating a journal, deleting a journal, querying a journal receiver, and displaying an output based upon a journal receiver; (e) receiving a first meta command that comprises an automated command wherein automation is based upon at least one of a set of conditional rules and a user-defined schedule; (f) displaying through a media output device a representation of the journaling-capable file system; (g) displaying through a media output device a user interface representing the set of meta commands; (h) performing at least one operation on the journaling-capable file system using an application programming interface; and (i) performing at least one operation on the journaling-capable file system using a scripting engine.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "journaling-capable file system", and related terms including "journaling file system" and "journal file system, refer to a file system which utilizes a journal to record changes made to the file system prior to writing. In many examples, the journal is written to a circular buffer.

As used herein, the term "journal receiver" refers to a file that contains the information that a journal is recording. In most examples, when a journal is created, a corresponding journal receiver is created. Conversely, typically when a journal receiver is purged a journal is also purged.

As used herein, the term "database" may refer to either a body of data, or to a relational database management system (RDBMS), or both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL®, IBM® DB2, Microsoft® SQL Server, Sybase®, and PostgreSQL. However, any database may be used that enables the systems and methods described herein. (Oracle and MySQL are registered trademarks of Oracle Corporation, Redwood Shores, California; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.) As used herein, the term "database system" refers specifically to a RDBMS.

In one embodiment, a computer program is provided, and the program is embodied on a computer readable medium. In an example embodiment, the system is executed on a single computer system, without requiring a connection to a server computer. The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the invention by way of example and not by way of limitation. It is contemplated that the invention has general application to managing computing infrastructures.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

FIG. 1 illustrates an example configuration of a user system 102 for managing and querying journaling-capable file systems in accordance with one embodiment of the present invention, operated by a user 101. User 101 may be a user of any proficiency or skill including a system administrator, a programmer, a business analyst, and a novice user. In the example embodiment, user system 102 includes a processor 105 for executing instructions. In some embodiments, executable instructions are stored in a memory area 110. Processor 105 may include one or more processing units, for example, a multi-core configuration. Memory area 110 is any device allowing information such as executable instructions and/or written works to be stored and retrieved. Memory area 110 may include one or more computer readable media.

User system 102 also includes at least one media output component 115 for presenting information to user 101. Media output component 115 is any component capable of conveying information to user 101. In some embodiments, media output component 115 includes an output adapter such as a video adapter and/or an audio adapter. An output adapter is operatively coupled to processor 105 and operatively couplable to an output device such as a display device, a liquid crystal display (LCD), organic light emitting diode (OLED) display, or "electronic ink" display, or an audio output device, a speaker or headphones.

In some embodiments, user system 102 includes an input device 120 for receiving input from user 101. Input device 120 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 115 and input device 120. User system 102 may also include a communication interface 125, which is communicatively couplable to a remote device. Communication interface 125 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 110 are, for example, computer readable instructions for providing a user interface to user 101 via media output component 115 and, optionally, receiving and processing input from input device 120. A user interface may include, among other possibilities, a web browser and client application. Web browsers enable users, such as user 101, to display and interact with media and other information typically embedded on a web page or a website. A client application allows user 101 to interact with a server application.

User system 102 is also capable of communicating with database 130. Database 130 may be configured to store structured data to facilitate the system and method described herein. Such data may include, without limitation, the mapping between meta commands and standard journaling commands, calls and procedures using application programming interfaces, calls and procedures using scripting engines, user profile data, system profile data, system default settings, security settings, and historical data related to the management of the journaling-capable file systems. In the example embodiment, database 130 is stored separately from user system 102. In alternative embodiments, database 130 may be stored on user system 102 at, for example, memory 110.

Figure 2:
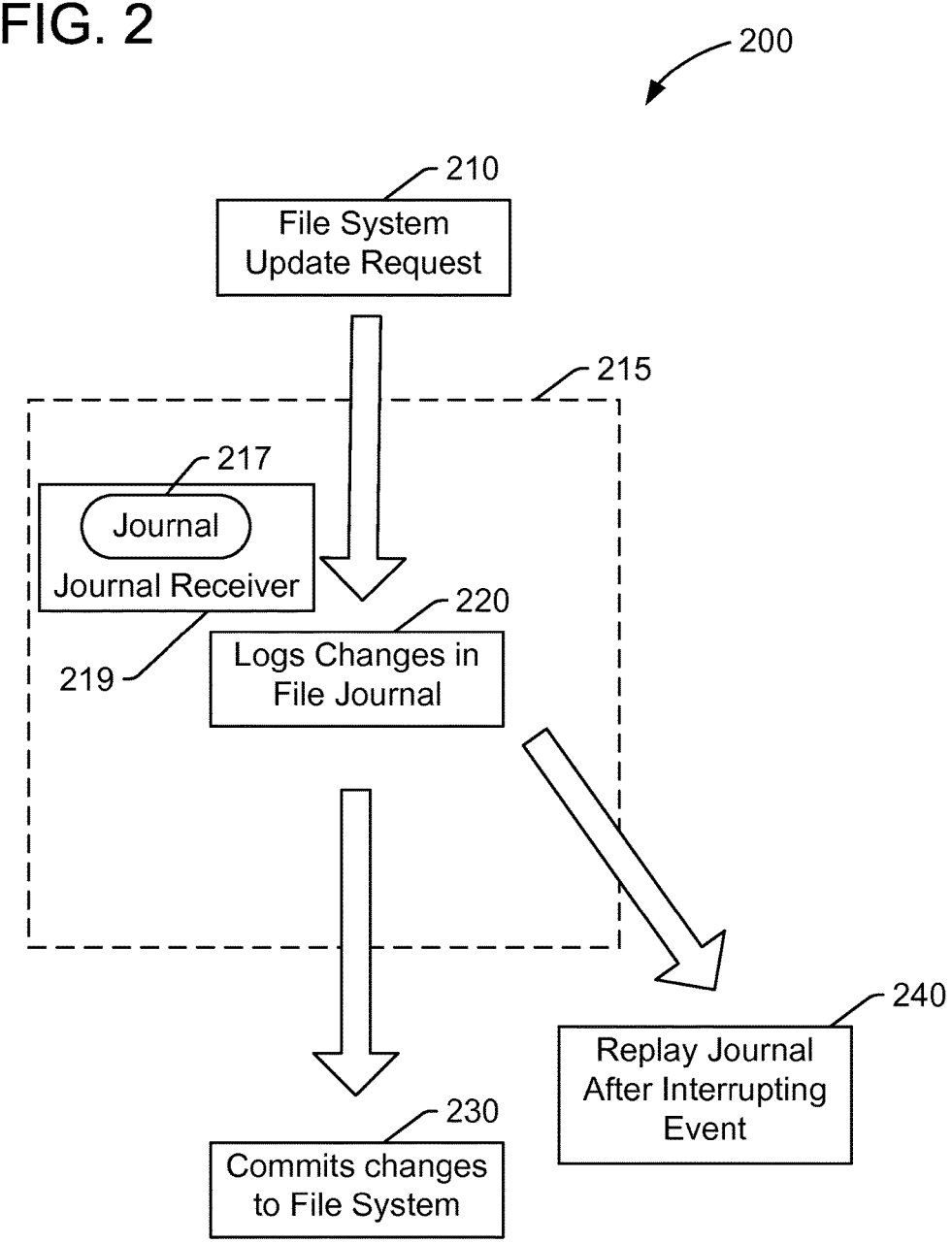
FIG. 2 is a simplified flowchart illustrating the function of a typical journaling-capable file system using a computing device such as the computing device of FIG. 1.

FIG. 2 is a simplified flowchart 200 illustrating the function of a typical journaling-capable file system 215 using computing device 102 (shown in FIG. 1). As described above, journaling-capable file systems 215 are used to reduce risks, particularly risks caused by file inconsistencies, posed by interrupting events. In order to accomplish this, a journaling-capable file system 215 will write a journal 217 of all pending changes to a file system before executing such changes. Typically, this journal 217 will be written as a circular buffer. A circular buffer is typically used for a journal 217 because it allows journal 217 to have entries added and removed without significant restructuring. Journal 217 will be written separately from the file system itself in journal receiver 219. Journal receiver 219 refers to a file that contains the information that journal 217 is recording. Journaling-capable file systems may use physical journals or logical journals. Physical journals record every individual block that will be written to the file system. Logical journals record only metadata updates to the file system. Accordingly, physical journals are more fault tolerant but also far more resource intensive than logical journals. Although the systems and methods described herein may be used with physical or logical journals, the example embodiment uses logical journals.

In the flowchart, a file system update request 210 is received by journaling-capable file system 215. The file system update request 210 represents any change to the file system including creates, modifies, and deletes. Journaling-capable file system 215 will then log changes 220 in file journal 217 before committing changes to file system 230. If an interrupting event 240 occurs, the file system may need to recover from an inconsistency. In such a situation, journaling-capable file system 215 will replay journal 217 after the interrupting event 240. "Replaying" represents using journal 217 to execute changes recorded in journal 217 but not committed because of interrupting event 240.

Figure 3:
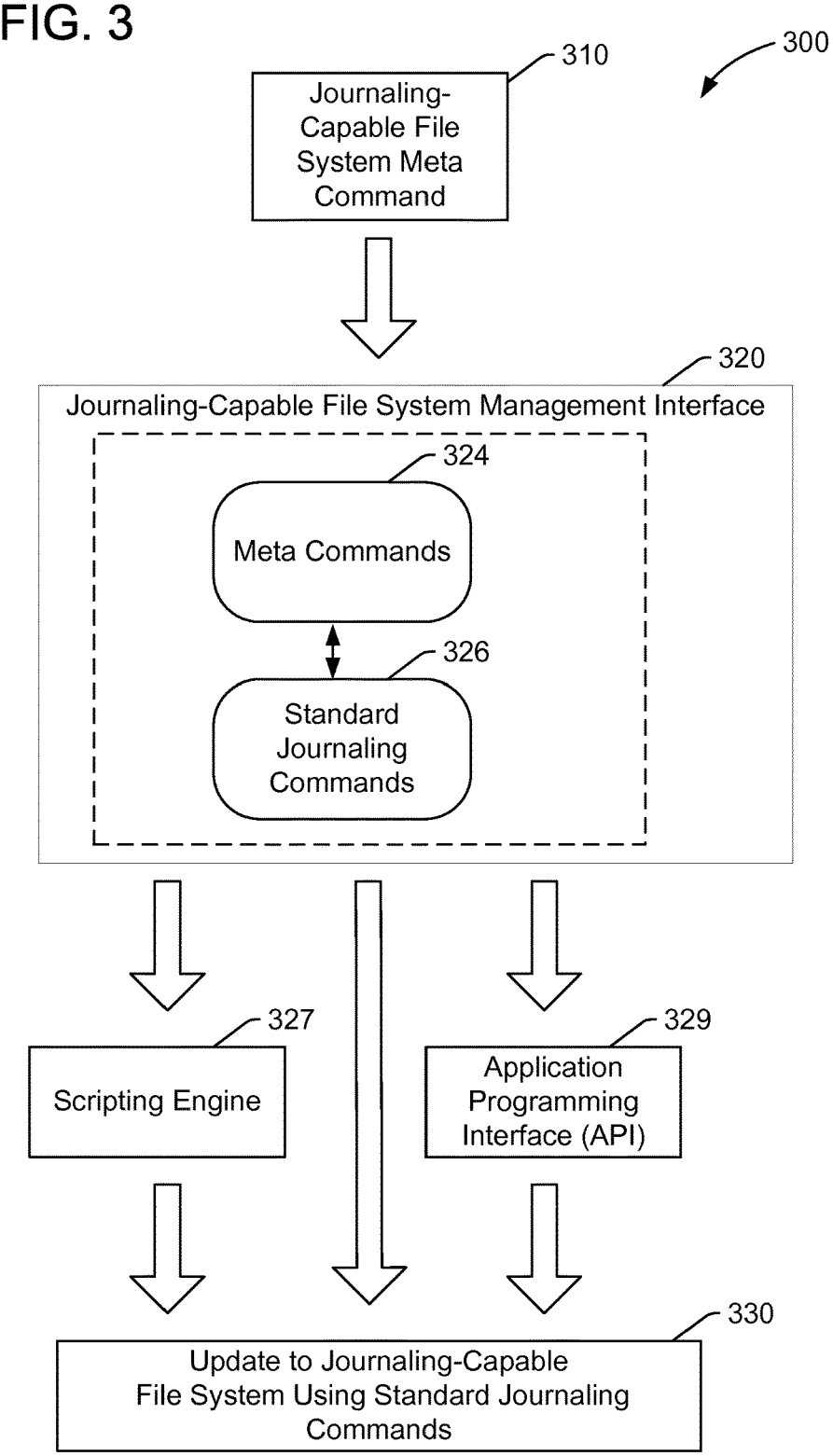
FIG. 3 is a simplified flowchart illustrating the function of the system and method described for managing and querying journaling-capable file systems, such as the journaling-capable file system of FIG. 2 running on the computing device of FIG. 1, in accordance with one embodiment of the present invention.

FIG. 3 is a simplified flowchart illustrating the function of the system and method described for managing and querying journaling-capable file systems, such as journaling-capable file system 215 (shown in FIG. 2) running on computing device 102 (shown in FIG. 1), in accordance with one embodiment of the present invention. A system administrator, such as user 101 (show in FIG. 1) provides a journaling-capable file system meta command 310 to the journaling-capable file system management interface 320. Journaling-capable file system meta command 310 may represent any meta command related to the management and querying of the journaling-capable file system including, without limitation, generating a journal receiver 219 (shown in FIG. 2), deleting a journal receiver 219, querying a journal receiver 219, displaying an output based upon a journal receiver 219, swapping a journal receiver 219, editing a journal receiver 219, starting journaling, stopping journaling, generating a journal 217 (shown in FIG. 2), and deleting a journal 217. Journaling-capable file system meta commands 310 are generated by a user such as user 101 interacting with computing device 102. In the example embodiment, journaling-capable file system meta commands 310 are generated by input from user 101 to a textual user-interface. In alternative embodiments, journaling-capable file system meta commands 310 are generated by input from user 101 to any interface including a graphical user-interface ('GUI').

Journaling-capable file system management interface 320 includes an internal mapping schema 322. Internal mapping schema 322 represents the mapping between meta commands 324, such as journaling-capable file system meta command 310, and standard journaling commands 326. Standard journaling commands 326 represent commands which may be used to administer a journaling-capable file system. In the example embodiment, internal mapping schema 322 is represented in database 130 (shown in FIG. 1). In alternative embodiments, internal mapping schema 322 may be represented in any data structure capable of being used to map meta commands 324 to standard journaling commands 326. In most instances, a single meta command 324 will map to a plurality of standard journaling commands 326.

In operation, journaling-capable file system meta command 310 is received at journaling-capable file system management interface 320 and converted to a plurality of standard journaling commands 326 using internal mapping schema 322. The plurality of standard journaling commands 326 are used to update journaling-capable file system 215 using standard journaling commands 326. In some examples, standard journaling commands 326 are executed directly by user system 102. In other examples, the journaling-capable file system management interface 320 will use a scripting engine 327 to facilitate executing standard journaling commands 326. In further examples the journaling-capable file system management interface 320 will use an application programming interface ('API') 329 to facilitate executing standard journaling commands 326.

Figure 4:
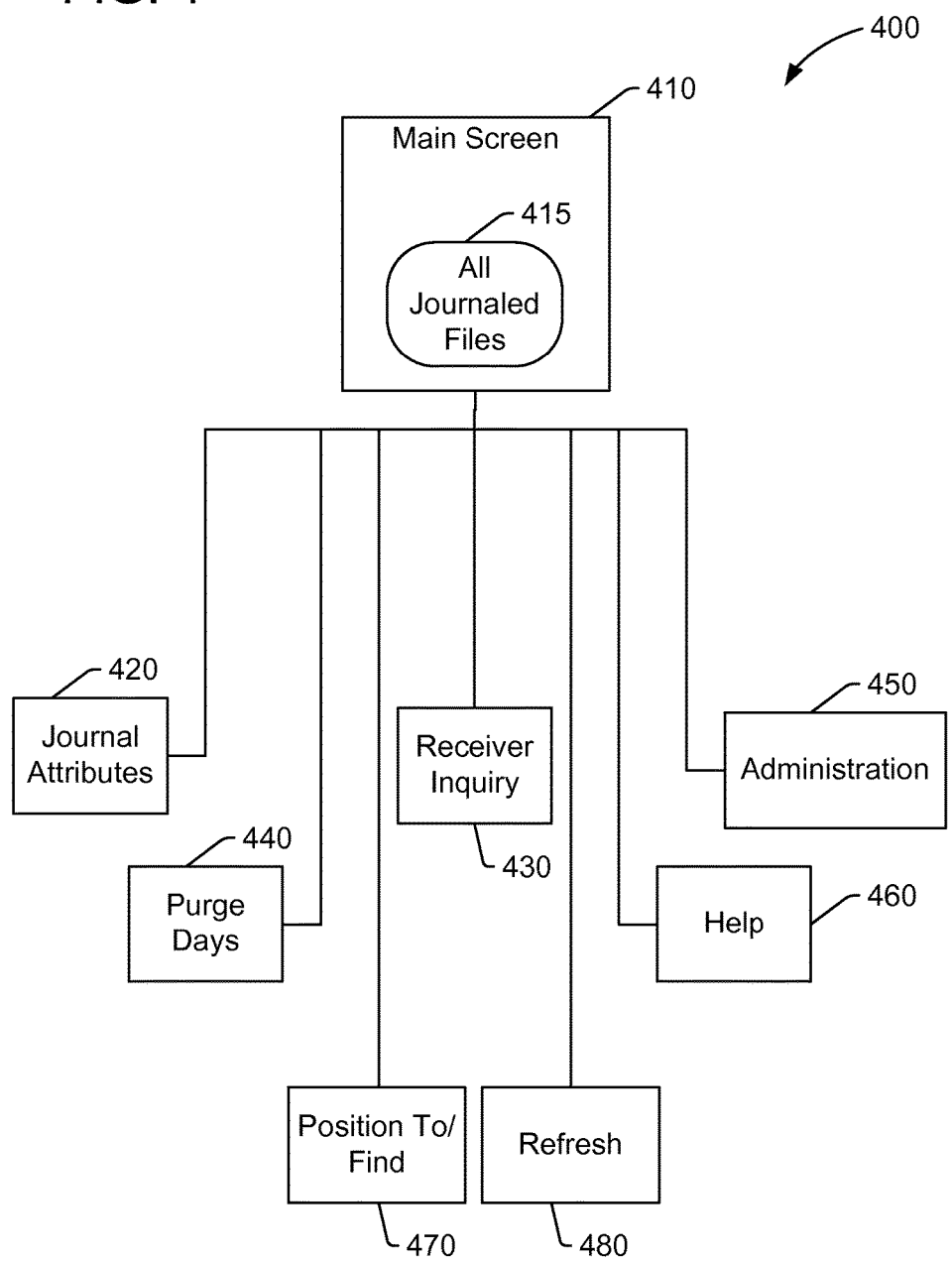
FIG. 4 is a first illustration of options, including meta commands, presented by the journaling-capable file system management interface of FIG. 3 on the system of FIG. 1 used for managing and querying a journaling-capable file system.

FIG. 4 is first illustration 400 of options, including meta commands 324 (shown in FIG. 3), presented by the journaling-capable file system management interface 320 (shown in FIG. 3) on user system 102 (shown in FIG. 1) used for managing and querying journaling-capable file system 215 (shown in FIG. 2). Illustration 400 depicts options available on main screen 410 which is presented to a user such as user 101 (shown in FIG. 1). Main screen 410 and the options presented in illustration 400 are presented at least when user 101 first opens file system management interface 320. Main screen 410 includes information related to all journaled files 415 for all journal receivers 219 (shown in FIG. 2).

Main screen 410 allows user 101 to display journal attributes 420. Display journal attributes 420 allows user system 102 to display information related to those journals 217 (shown in FIG. 2).

Main screen 410 also allows user 101 to perform a receiver inquiry 430. Receiver inquiry 430, discussed below, allows user 101 to query and manage a particular receiver or receivers.

Main screen 410 further allows user 101 to set purge days 440. Purge days 440 allow user 101 to specify the number of days that detached receivers may be saved. Any receivers that are older than the specified number of days will be purged. Purge days 440 can be set differently for each journal or journal type.

Purge days 440 represents receiving meta command 324 (shown in FIG. 3) where user 101 specifies that a purge occur for detached receivers which are of a particular age. Purge days 440 further represents converting meta command 324 to standard journaling commands 326 (shown in FIG. 3) which are executed on journaling-capable file system 215 (shown in FIG. 2). Specifically, delete commands are generated by purge days 440 and executed on the journaling-capable file system 215 at a particular scheduled time. System 102 may utilize a combination of tools, discussed below, to execute such a scheduled activity including scripting engines 327 (shown in FIG. 3) and application programming interfaces ('APP) 329 (shown in FIG. 3).

Main screen 410 additionally allows user 101 to administer 450 the journaling-capable file system. Administration 450, discussed below, allows user 101 to perform tasks including creating a journal receiver 219, creating a journal 217, starting journaling, stopping journaling, and deleting journals 217 and journal receivers 219.

Main screen 410 also allows user 101 to access help 460. Help 460 includes descriptions of the functions available to user 101 and tips and advice on how to manage and query the journaling-capable file system 215.

Main screen 410 further allows user 101 to position to or find 470 a particular journal 217. In some instances where a large number of journals 217 are created, it may be time-consuming for user 101 to browse through the available journals 217. Position to or find 470 may make such navigation more efficient. User 101 may position to 470 a particular journal 217 when the location of journal 217 is known. Alternately, user 101 may find 470 a particular journal 217 by typing a portion of text associated with the name of journal 217 or file text.

Main screen 410 additionally allows user 101 to refresh 480. Refresh 480 may be used to re-query the journaling-capable file system 215 when updates have been made which are not yet present in the display of main screen 410. Refresh 480 may be used in an automated manner. If refresh 480 is automated, it may be scheduled on a periodic basis. Refresh 480 refreshes information on main screen 410 to reflect changes to journals 217 including new files and changes to journal sizes.

Figure 5:
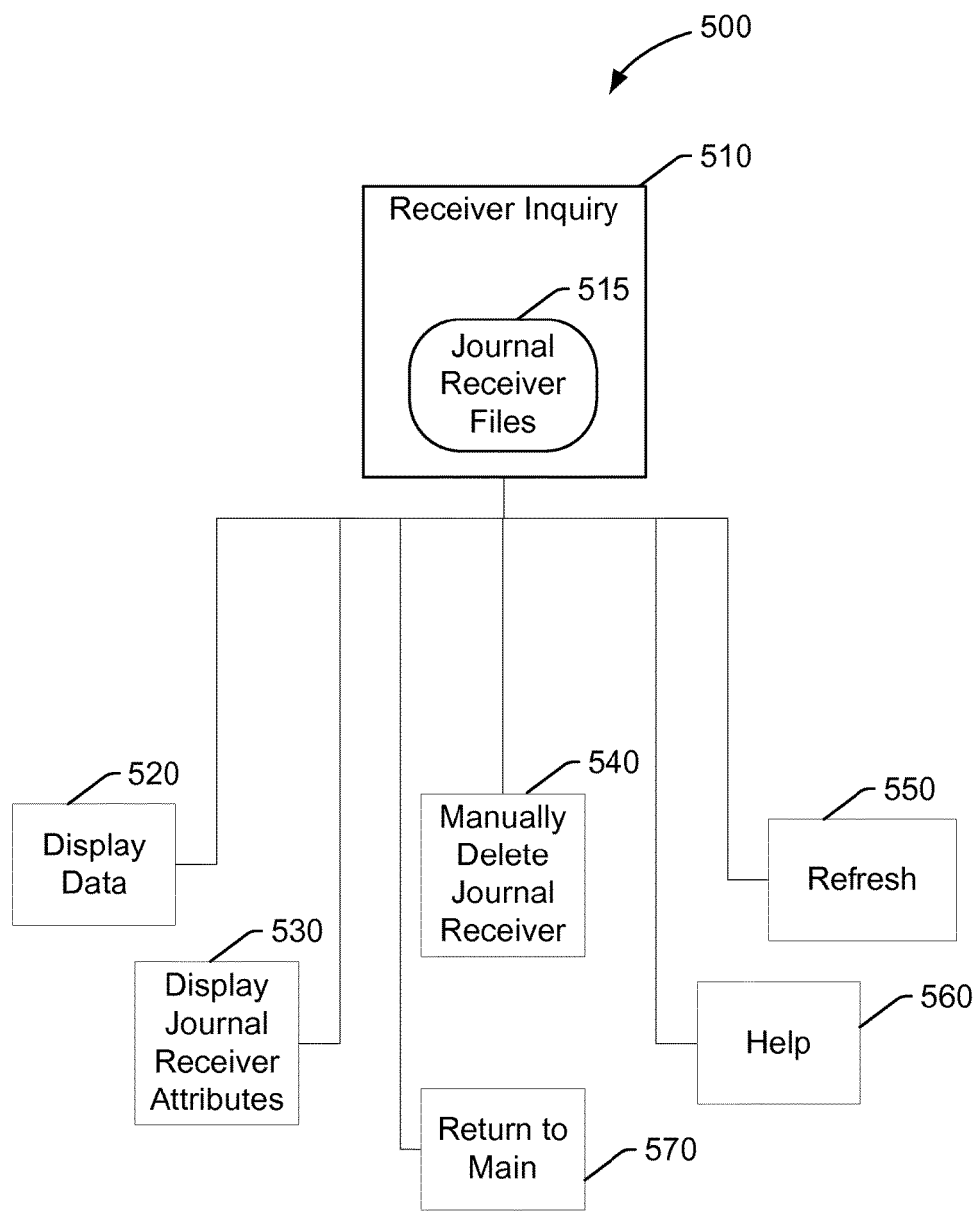
FIG. 5 is a second illustration of options, including meta commands, presented by the journaling-capable file system management interface of FIG. 3 on the system of FIG. 1 where the options are used for managing and querying a journaling-capable file system.

FIG. 5 is second illustration 500 of options, including meta commands 324 (shown in FIG. 3), presented by the journaling-capable file system management interface 320 (shown in FIG. 3) on user system 102 (shown in FIG. 1) used for managing and querying journaling-capable file system 215 (shown in FIG. 2). Illustration 500 depicts receiver inquiry 510. Receiver inquiry 510 displays journal receiver files 515 representing all journal receivers 219 (shown in FIG. 2) associated with journals 217 (shown in FIG. 2) displayed on main screen 410 (shown in FIG. 4). Journal receiver files 515 are selected by a user selecting a particular journaled file in main screen 410 and selecting receiver inquiry 430 (shown in FIG. 4).

Receiver inquiry 510 allows a user such as user 101 (shown in FIG. 1) to display data 520, discussed further below, associated with a particular journal 217, that is stored within journal receivers 219 that are or were attached to the journal 217. When a user such as user 101 selects a particular journal 217 from the main screen 410, they are presented with receiver inquiry 510 where they can then select which receivers they would like to query.

Receiver inquiry 510 also allows user 101 to display journal receiver attributes 530. Display journal receiver attributes 530 shows the creation and current attributes of a journal receiver 219. Current attributes include the name of the journal 217 the journal receiver 219 is currently attached to. If the journal receiver 219 is not currently attached, current attributes include the name of the journal 217 the journal receiver 219 was last attached to, along with the date and time it was detached.

Receiver inquiry 510 further allows user 101 to manually delete 540 journal receiver 219. Deleting journal receiver 219 will purge journal receivers 219 along with the data they contain. When a journal receiver 219 reaches a particular file size, journal receiver 219 is automatically detached from journal 217. A new journal receiver 219 is automatically attached to journal 217 at the same time. Detached journal receiver 219 is an archived record and unable to log changes in the journaling-capable file system. Due to the potential decreasing value of archived records and costs of data storage, user 101 may find it valuable to delete such detached journal receivers 219. Deleting 540 journal receiver 219 represents receiving a meta command 324 (shown in FIG. 3) which is converted to a standard journaling command 326 (shown in FIG. 3) (i.e., a delete command for a particular journal receiver) which is executed at the journaling-capable file system 215. Receiver inquiry 510 also allows user 101 to refresh 550.

Refresh 550 may be used to re-query the journaling-capable file system 215 which are not in the query tool environment. Refresh 550 allows user 101 to select particular journal receivers 219 and place them in the query tool environment where user 101 can efficiently query the journaling-capable file system 215.

Receiver inquiry 510 also allows user 101 to access help 560. Help 560 includes descriptions of the functions available to user 101 and tips and advice on how to manage and query the journaling-capable file system 215 in receiver inquiry 510. Receiver inquiry 510 also allows user 101 to return to main screen 570.

Figure 6:
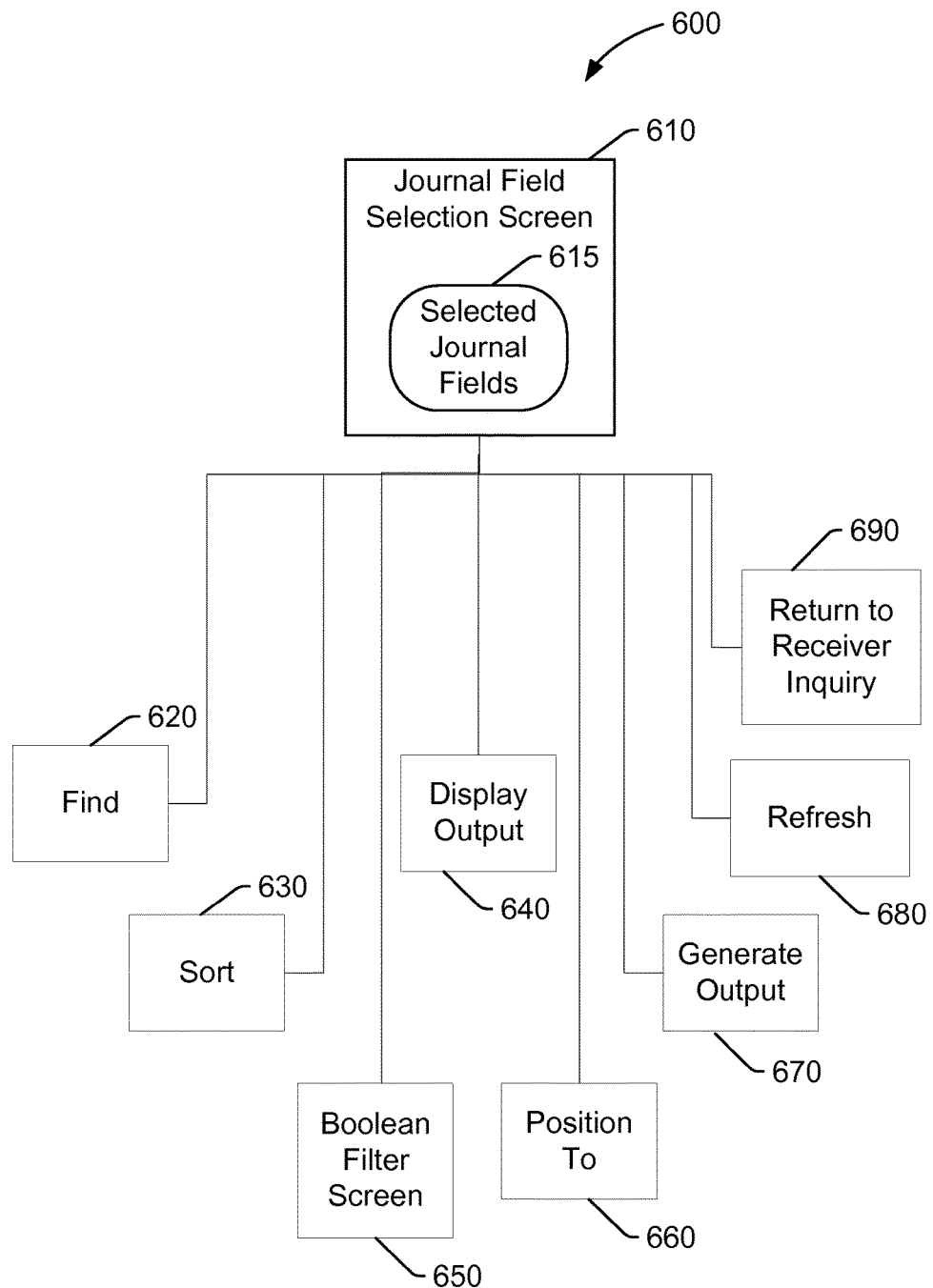
FIG. 6 is a third illustration of options, including meta commands, presented by the journaling-capable file system management interface of FIG. 3 on the system of FIG. 1 where the options are used for managing and querying a journaling-capable file system.

FIG. 6 is third illustration 600 of options, including meta commands 324 (shown in FIG. 3), presented by the journaling-capable file system management interface 320 (shown in FIG. 3) on user system 102 (shown in FIG. 1) used for managing and querying journaling-capable file system 215 (shown in FIG. 2). Illustration 600 depicts journal field selection screen 610. Journal field selection screen 610 displays information regarding selected journal fields 615 which are selected from journals 217 (shown in FIG. 2). Selected journal fields 615 may include information regarding journals 217 including, without limitation, the length of the journal 217, the sequence of the journal 217, a code or identifier of the journal 217, a categorization of the journal 217, a date of entry for a journal event, a time of entry for a journal event, a name of a job run which changed journal 217, a number of a job which changed journal 217, a name of a user profile which changed journal 217, a name of a program which alters journal 217, a name of a journaled file 415 (shown in FIG. 4) which is altered, and a name of a library in which journaled file 415 is located.

Journal field selection screen 610 allows a user such as user 101 (shown in FIG. 1) to view information regarding selected journal fields 615. Selected journal fields 615 are selected by user 101 choosing the display data 520 (shown in FIG. 5) function for a selected journal receiver 219 (shown in FIG. 2). Selected journal fields 615 are displayed in the output by user 101 choosing display output 640 for a particular query or filter of data for a selected journal field 615. User 101 can use find 620 and sort 630 to navigate through information pertaining to selected journal fields 615.

Journal field selection screen 610 may generally allow user 101 to audit the use of a file system and determine how a particular file was changed, when a particular file was changed, and identify a user profile associated with changing the file. For example, user 101 may use a customer database file including a variety of fields corresponding to customer information. Each time the customer information is changed, the changed records associated with the change are recorded. Accordingly, journal field selection screen 610 can be used to audit such changes.

User 101 can create a Boolean filter regarding selected journal fields 615 by using Boolean filter screen 650. When Boolean conditions set on Boolean filter screen are not met by data within particular journals 217, selected journal fields 615 are either not altered in a particular way (e.g., edited, swapped, or deleted) or are filtered out of a query reply prior to display to a viewer. Boolean filter screen 650 is discussed further below.

User 101 can also position to 660 a particular selected journal field 615. In some instances where a large number of selected journal fields 615 are displayed, it may be time-consuming for user 101 to browse through the available selected journal fields 615. Position to 660 may make such navigation more efficient.

User 101 can additionally generate output 670 by displaying the output related to selected journals fields 615 on the display, printing the output related to selected journal fields 615 to a report, and writing the output related to selected journal fields 615 to a file. Generating output 670 is discussed further below.

Journal field selection screen 610 also allows user 101 to refresh 680. Refresh 680 may be used to clear journal field selection screen 610 of any selections and filters made by user 101. User 101 can additionally navigate back to receiver inquiry screen 510 by using return to receiver inquiry 690.

Figure 7:
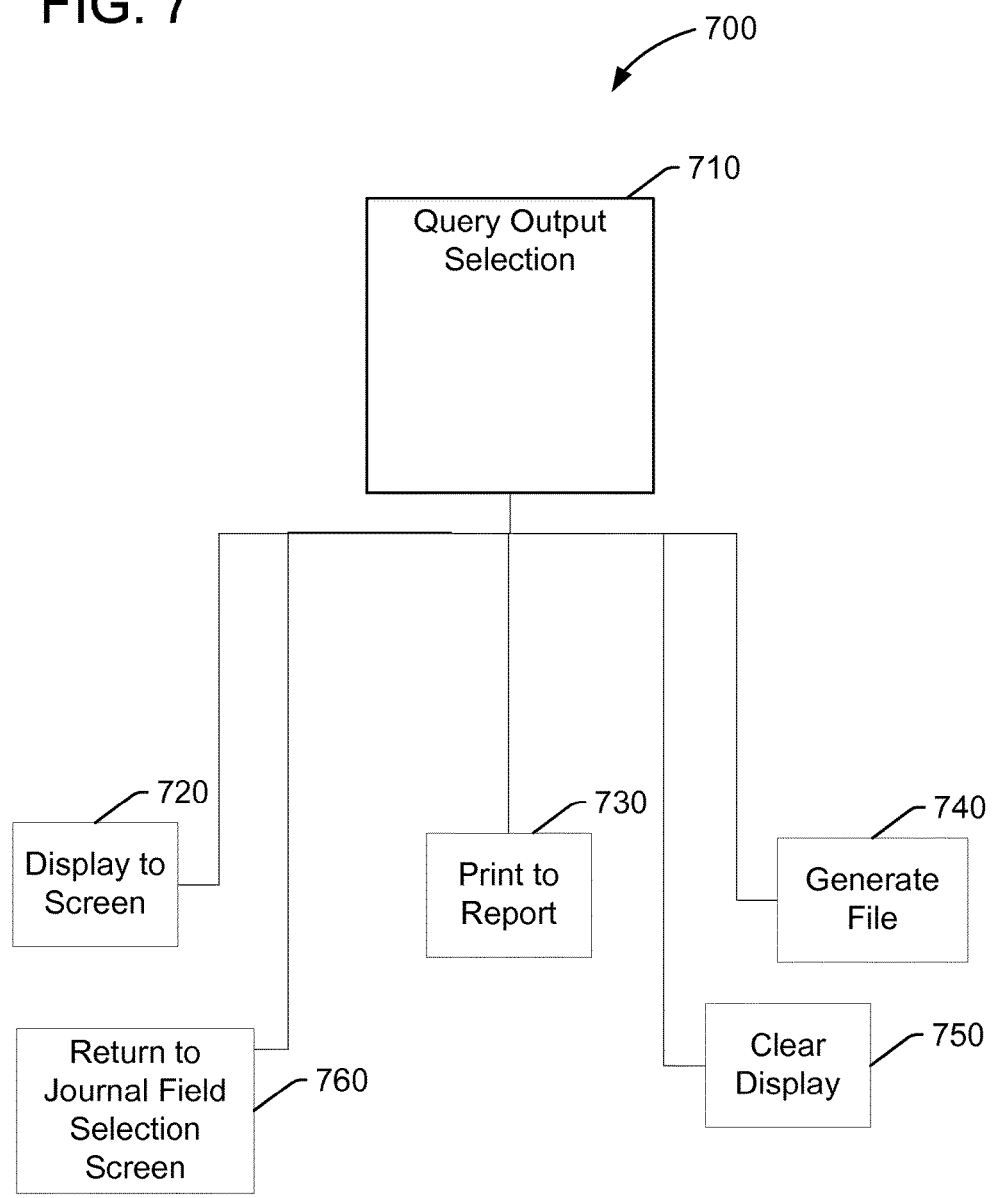
FIG. 7 is a fourth illustration of options, including meta commands, presented by the journaling-capable file system management interface of FIG. 3 on the system of FIG. 1 where the options are used for managing and querying a journaling-capable file system.

FIG. 7 is fourth illustration 700 of options, including meta commands 324 (shown in FIG. 3), presented by the journaling-capable file system management interface 320 (shown in FIG. 3) on user system 102 (shown in FIG. 1) used for managing and querying journaling-capable file system 215 (shown in FIG. 2). Illustration 700 depicts query output selection 710. A user such as user 101 (shown in FIG. 1) can use query output selection 710 to display output related to the journaling-capable file system 215. User 101 can display to screen 720, allowing a consolidated view of information related to a journal 217 (shown in FIG. 2) or journals 217 to be published to the display, media output component 115 (shown in FIG. 1). User 101 can also print to a report 730, allowing a consolidated view of information related to a journal 217 or journals 217 to be formatted and printed. User 101 can additionally generate file 740, allowing a consolidated view of information related to a journal 217 or journals 217 to be written to a file. Generating file 740 also allows user to select between creating a new file, adding to an existing file, and replacing a file. User 101 can also clear display 750 or return to journal field selection screen 760.

Using functions for display to screen 720, print to report 730, and generate file 740 includes using a function for querying the journaling-capable file system 215 for information related to a journal 217 or journals 217. In order to query the journaling-capable file system 215, user system 102 first processes a meta command 324 (shown in FIG. 3) representing requesting information related to a journal 217 or journals 217. This meta command 324 is converted to a standard journaling command 326 (shown in FIG. 3) and executed with the result displayed, printed, or written to file.

Figure 8:
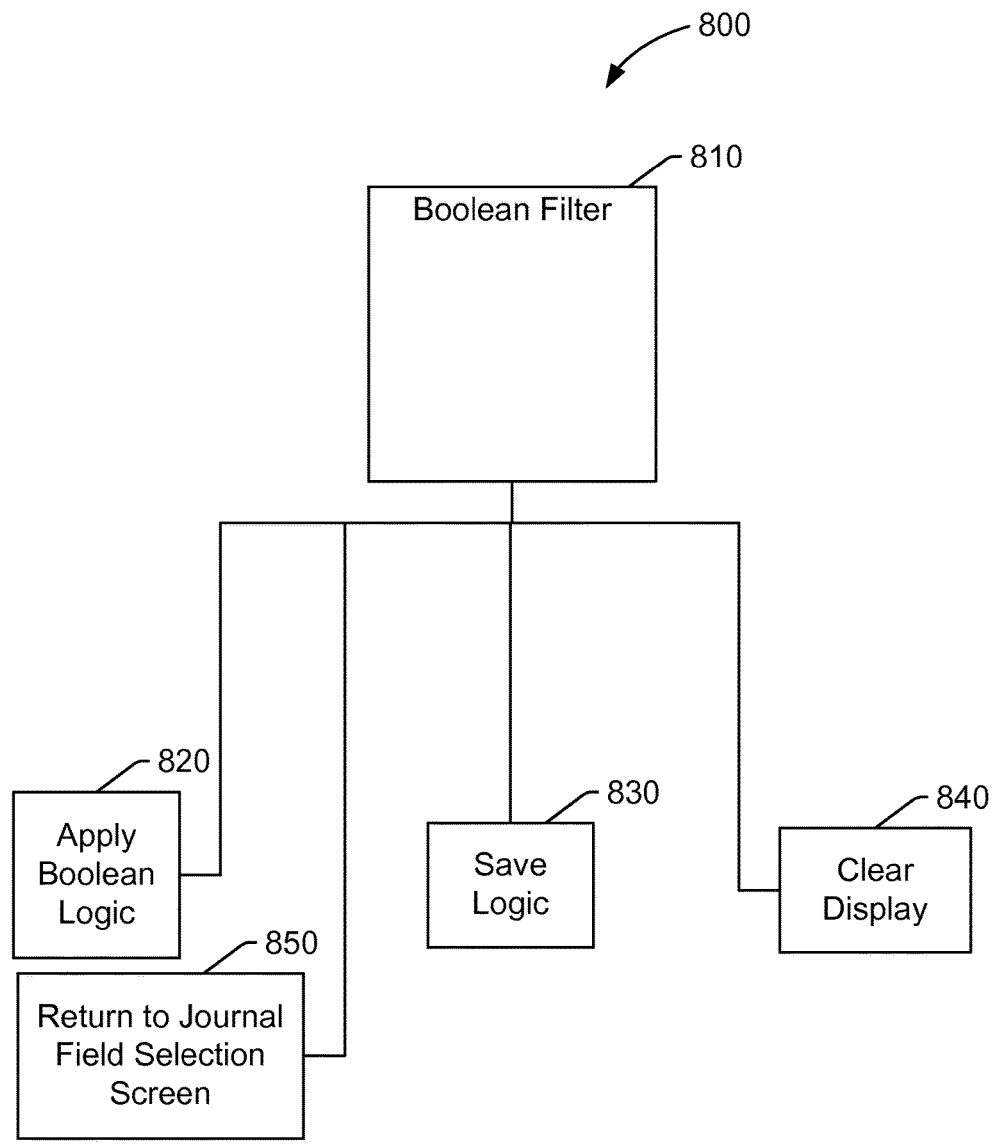
FIG. 8 is a fifth illustration of options, including meta commands, presented by the journaling-capable file system management interface of FIG. 3 on the system of FIG. 1 where the options are used for managing and querying a journaling-capable file system.

FIG. 8 is fifth illustration 800 of options, including meta commands 324 (shown in FIG. 3), presented by the journaling-capable file system management interface 320 (shown in FIG. 3) on user system 102 (shown in FIG. 1) used for managing and querying journaling-capable file system 215 (shown in FIG. 2). Illustration 800 depicts Boolean filter screen 810. Boolean filter screen 810 can be used to create filters to identify particular journals 217 that match Boolean conditions. Boolean filters can be applied to journaling-capable file system management tasks as well as to journaling-capable file system 215 query. In a first example, a user such as user 101 (shown in FIG. 1) may seek to only delete journals 217 which are detached and over a particular threshold size of, for example, 2 MB. User 101 can set a Boolean filter to filter out any journal 217 of a smaller size and delete the others. In a second example, a user 101 may seek to only show journals 217 which have been updated in the past three hours. User 101 may create a filter by using the apply Boolean logic 820 feature. In some cases, user 101 may wish to reuse filters and may save Boolean logical filters in memory 110 (shown in FIG. 1). User 101 can use save logic 830 to allow for the reuse of Boolean logic filters. User 101 can also clear the display 840 and return to the journal field selection screen 850.

Figure 9:
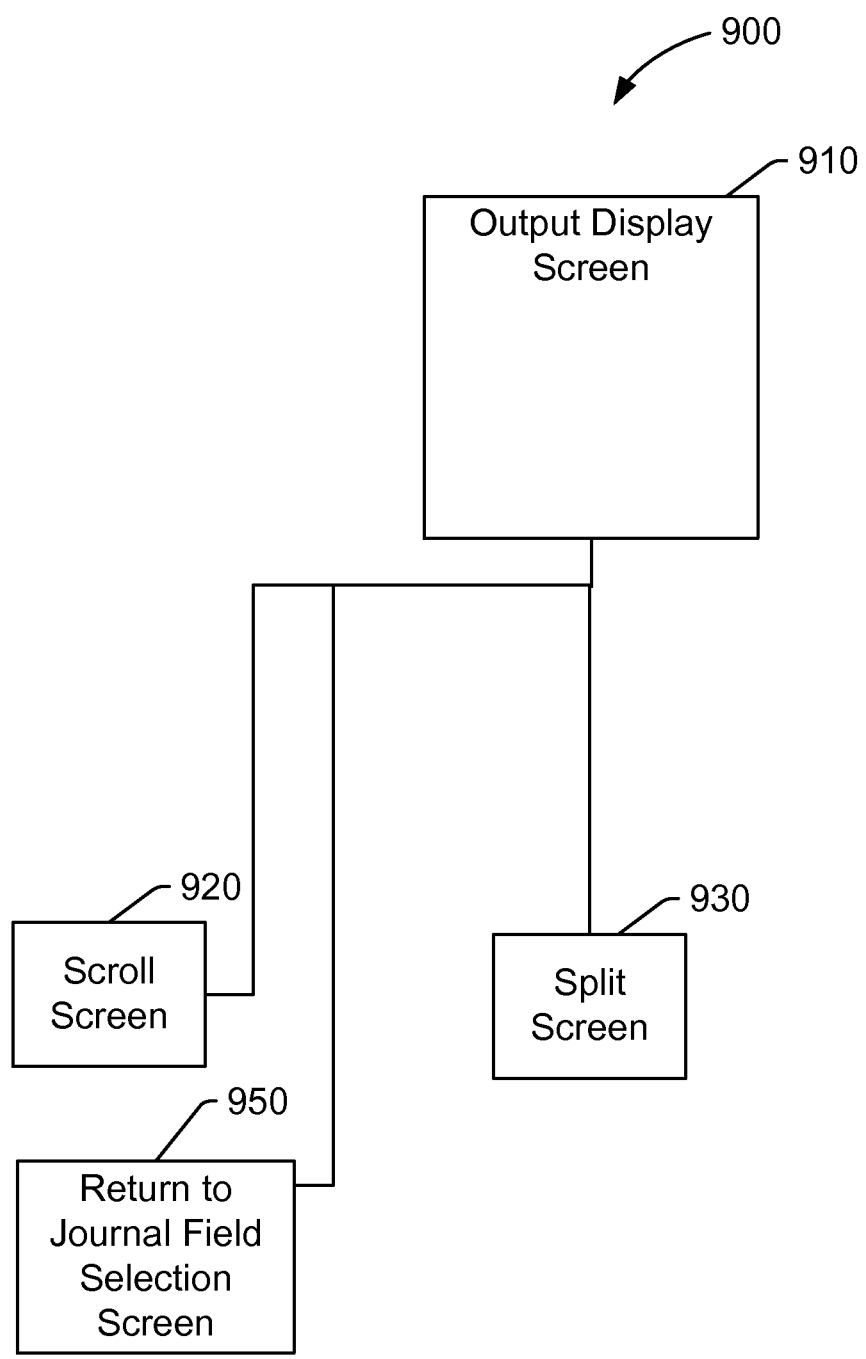
FIG. 9 is a sixth illustration of options, including meta commands, presented by the journaling-capable file system management interface of FIG. 3 on the system of FIG. 1 where the options are used for managing and querying a journaling-capable file system.

FIG. 9 is sixth illustration 900 of options, including meta commands 324 (shown in FIG. 3), presented by the journaling-capable file system management interface 320 (shown in FIG. 3) on user system 102 (shown in FIG. 1) used for managing and querying journaling-capable file system 215 (shown in FIG. 2). Illustration 900 depicts output display screen 910. Output display screen 910 allows a user such as user 101 (shown in FIG. 1) to view information related to a journal 217 (shown in FIG. 2) or journals 217. In displaying output display screen 910, user system 102 first retrieves data for display by running a meta command 324 (shown in FIG. 3) associated with querying all information related to the journals 217 displayed. The meta command 324 is converted to standard journaling commands 326 (shown in FIG. 3), the resulting data received from executed standard journaling commands 326 is output and received by the query tool, and the result is displayed using the query tool. User 101 can scroll 920, view the information in split screen 930, and return to journal field selection screen 950.

Figure 10:
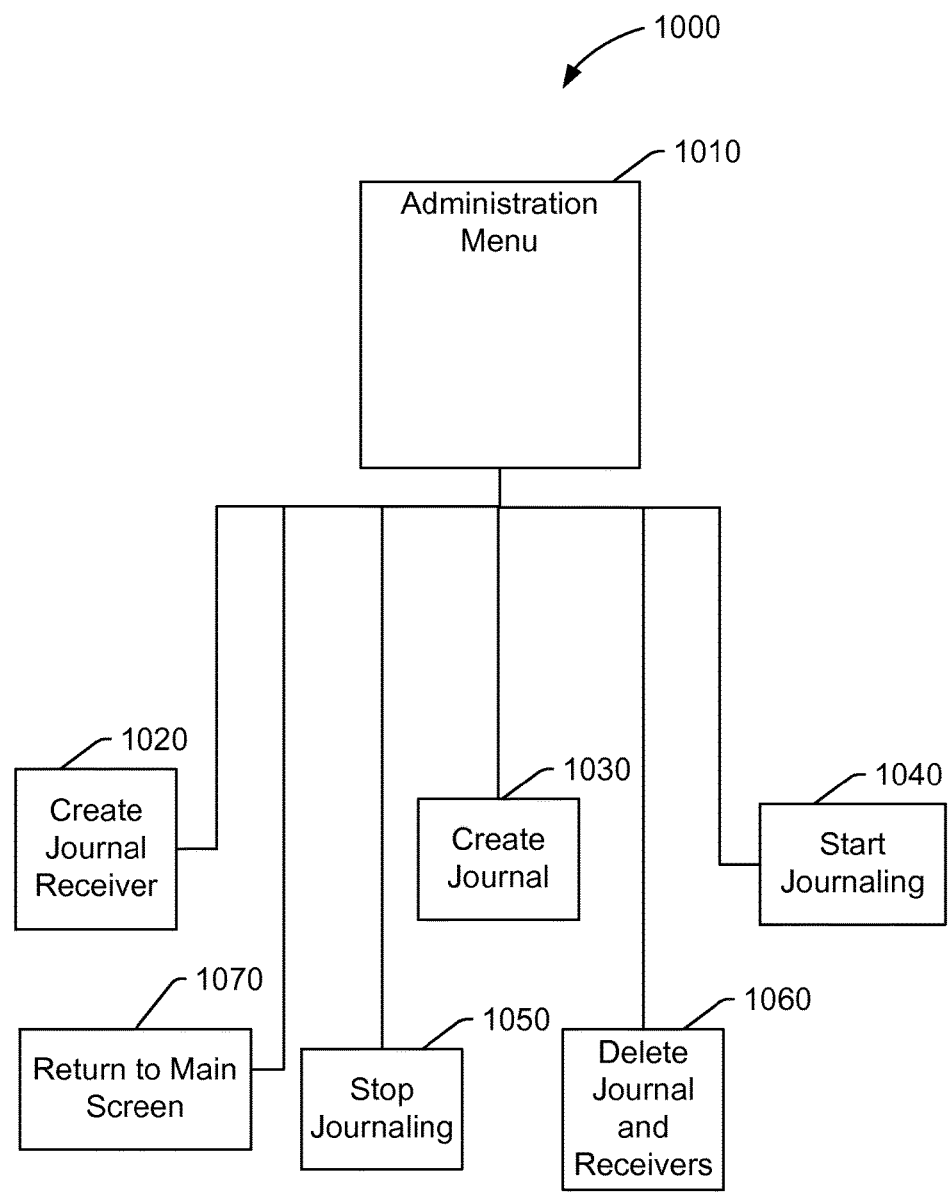
FIG. 10 is a seventh illustration of options, including meta commands, presented by the journaling-capable file system management interface of FIG. 3 on the system of FIG. 1 where the options are used for managing and querying a journaling-capable file system.

FIG. 10 is seventh illustration 1000 of options, including meta commands 324 (shown in FIG. 3), presented by the journaling-capable file system management interface 320 (shown in FIG. 3) on user system 102 (shown in FIG. 1) used for managing and querying journaling-capable file system 215 (shown in FIG. 2). Illustration 1000 depicts administration menu 1010. Administration menu 1010 allows a user, such as user 101 (shown in FIG. 1) to administrate the journaling-capable file system. User 101 may create a journal receiver 1020, create a journal 1030, start journaling 1040, stop journaling, 1050, and delete journals and receivers 1060. Alternately user 101 may return to main screen 1070.

Administrative functions include creating a journal receiver 1020, creating a journal 1030, starting journaling 1040, stopping journaling, 1050, and deleting journals and receivers 1060. These administrative functions represent receiving a meta command 324, converting the meta command 324 to standard journaling commands 326 (shown in FIG. 3), and executing the standard journaling commands 326 at the journaling-capable file system 215. For example, creating journal receiver 1020 involves many individual standard journaling commands 326 but only requires a single meta command 324.

Administration menu 1010 allows user 101 to manage all journals and journal receivers through a consolidated view. In one perspective, user 101 can see the state of all journals 217, create and delete journals 217, create journal receivers 219, and start and stop journaling by particular journals 217. In complex environments where many file systems are utilized, a large plurality of journals may exist. Management of all such journals 217 may be time-consuming Accordingly, the systems and methods described herein facilitate simplification and expediting of such management.

Figure 11:
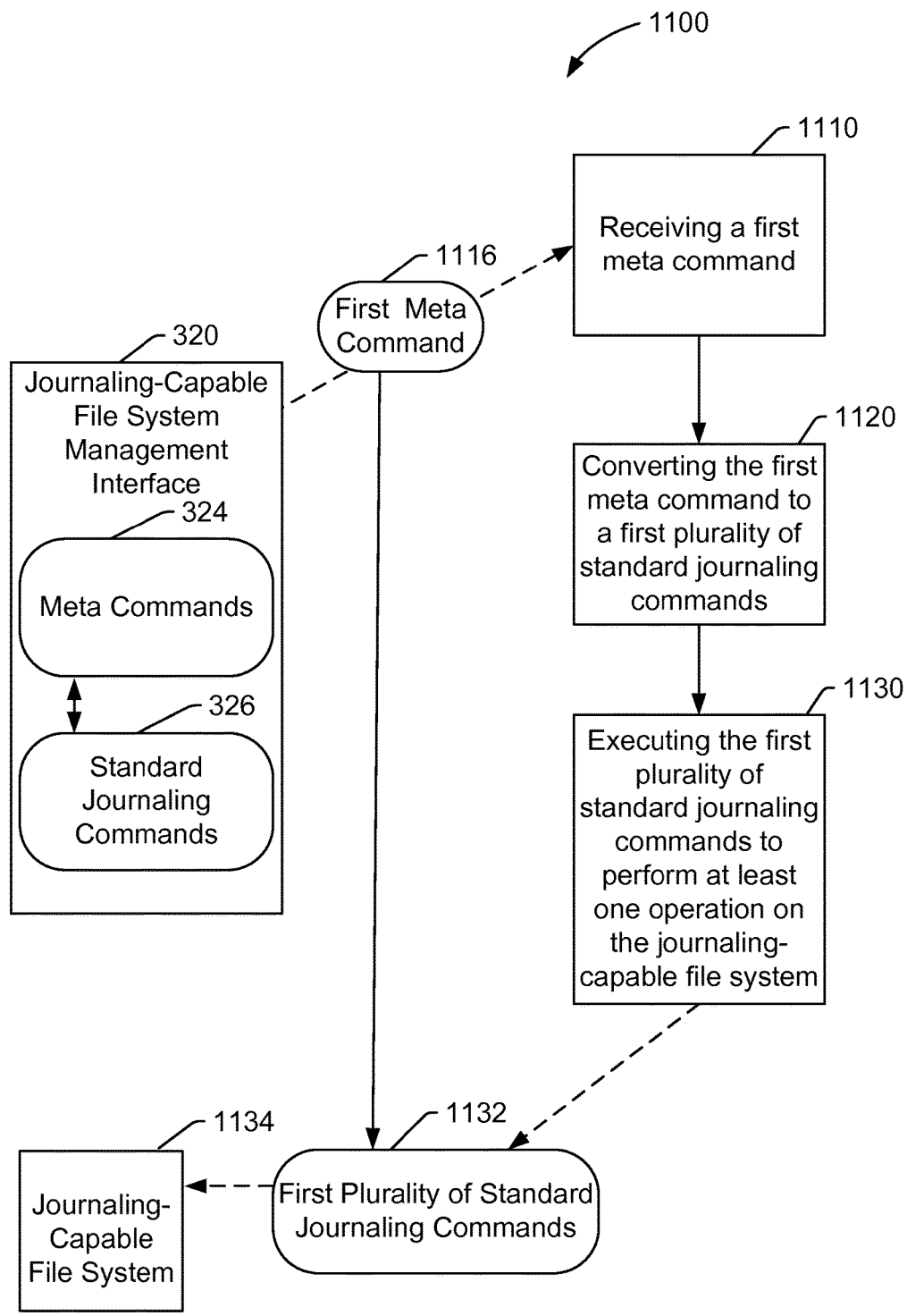
FIG. 11 is a flowchart illustrating an example process utilized by the system shown in FIG. 1 for managing and querying journaling-capable file systems.

FIG. 11 is a flowchart illustrating an example process utilized for managing and querying journaling-capable file system 215 (shown in FIG. 2) on system 102 (shown in FIG. 1). In operation, system 102 receives 1110 a first meta command 1116 from a user such as user 101 (shown in FIG. 1). First meta command 1116 is one of a plurality of meta commands 324 which may be received by journaling-capable file system management interface 320 and converted to standard journaling commands 326. For example, user 101 may enter a command to create a journal as first meta command 1116.

System 102 converts 1120 the first meta command to a first plurality of standard journaling commands. Standard journaling commands 326 are commands which may be received by a journaling-capable file system 215. System 102 uses an internal mapping schema 322 (shown in FIG. 3) to convert first meta command 1116 to first plurality of standard journaling commands 1132. Internal mapping schema 322 maps the relationships between meta commands 324 and standard journaling commands 326. To continue the example, first meta command 1116 is converted from a meta command requesting to create a journal to first plurality of standard journaling commands 1132 which represent component steps of creating a journal.

System 102 executes 1130 the first plurality of standard journaling commands to perform at least one operation on the journaling-capable file system 215. To complete the example, first plurality of standard journaling commands 1132 are executed at journaling-capable file system 1134. In the example embodiment, system 102 may utilize several tools which are available in the journaling-capable file system to execute the first plurality of standard journaling commands. System 102 may execute the standard journaling commands by submitting the commands via a command line interface ('CLI'). Alternately, system 102 may execute the journaling commands using an application programming interface ('API') 329 (shown in FIG. 3). The API 329 allows users to access functions and tools which may not otherwise be available through a CLI. The API 329 is designed to facilitate the operation of programs including the program described herein. In most cases, the API 329 is distributed by the vendor or support-provider of the journaling-capable file system. Additionally, system 102 may execute the journaling commands using a high-level programming language ('HPL') which is more abstract from system design than a typical programming language. An HPL is designed to facilitate the operation of programs including the program described herein. Also, system 102 may execute the journaling commands using a scripting engine 327 (shown in FIG. 3) which may be used to combine and automate tasks including scheduling of tasks.

Figure 12:
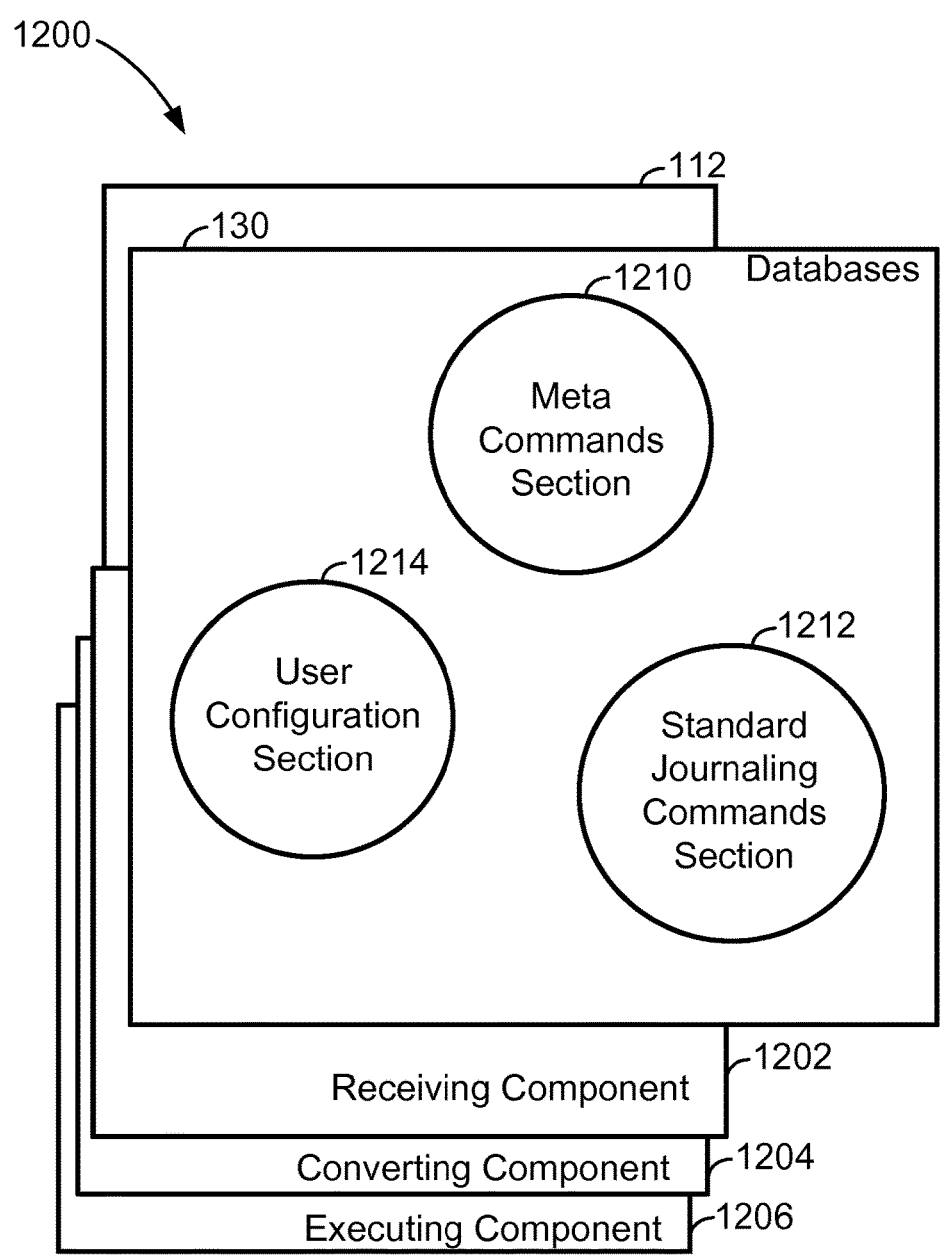
FIG. 12 is a diagram of components of one or more example computing devices that may be used with the system shown in FIG. 1.

FIG. 12 is a diagram of components of one or more example computing devices that may be used with system 102 (shown in FIG. 1). FIG. 12 further shows a configuration of databases including at least database 130 (shown in FIG. 1). Database 130 is coupled to several separate components within system 102, which perform specific tasks.

System 102 includes a receiving component 1202 for receiving a first meta command 324 (shown in FIG. 3) wherein the first meta command 324 corresponds to a first plurality of the standard journaling commands 326 (shown in FIG. 3). System 102 also includes a converting component 1204 for converting the first meta command 324 to the first plurality of standard journaling commands 326. System 102 additionally includes an executing component 1206 for executing the first plurality of standard journaling commands 326 to perform at least one operation on the journaling-capable file system 215.

In an exemplary embodiment, database 130 is divided into a plurality of sections, including but not limited to, a meta commands section 1210, a standard journaling commands section 1212, and a user configuration section 1214. These sections within database 130 are interconnected to update and retrieve the information as required.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for managing a journaling-capable file system, the method being implemented by a computing device including a processor and a memory coupled to the processor, wherein the memory includes a set of standard journaling commands, and a journaling-capable file system that is responsive to the set of standard journaling commands, said method comprising:

storing, in the memory, each of a plurality of meta commands, the plurality of meta commands including:
  i) a generate journal receiver meta command operable to cause the computing device to execute a plurality of standard journaling commands to generate a new journal receiver;
  ii) a delete journal receiver meta command operable to cause the computing device to execute a plurality of standard journaling commands to delete an existing journal receiver;
  iii) a generate journal meta command operable to cause the computing device to execute a plurality of standard journaling commands to generate a new journal;
  iv) a delete journal meta command operable to cause the computing device to execute a plurality of standard journaling commands to delete an existing journal;
  v) a query journal receiver meta command operable to cause the computing device to execute a plurality of standard journaling commands to query a journal receiver;
  vi) a display output meta command operable to cause the computing device to execute a plurality of standard journaling commands to display an output based on a journal receiver;
  vii) a stop journaling meta command operable to cause the computing device to execute a plurality of standard journaling commands to stop journaling by a journal;
  viii) a start journaling meta command operable to cause the computing device to execute a plurality of standard journaling commands to start journaling by a ournal;
  ix) a display journal attributes meta command operable to cause the computing device to execute a plurality of standard journaling commands to display information related to a journal; and
  x) a display journal receiver attributes meta command operable to cause the computing device to execute a plurality of standard journaling commands to display creation and current attributes of a journal receiver, the current attributes including one of a) the name of a journal that the journal receiver is currently attached to and b) the name of the journal the journal receiver was last attached to, along with the date and time that the journal receiver was detached from that journal;

receiving, by the computing device, a selection of a first meta command from the plurality of meta commands stored in the memory, wherein the first meta command corresponds to a first plurality of the standard journaling commands;

converting, by the computing device, the first meta command to the first plurality of standard journaling commands using an internal mapping schema, wherein the internal mapping schema maps at least one relationship between the first meta command and the first plurality of standard journaling commands, and wherein the first meta command pertains to at least one of a journal and a journal receiver, wherein the journal receiver is a file that contains the information that the associated journal is recording; and executing the first plurality of standard journaling commands on at least one of the journal and the journal receiver to perform at least one operation on the journaling-capable file system.

2. The method of claim 1, wherein the first meta command further comprises an automated command wherein automation is based upon at least one of a set of conditional rules and a user-defined schedule.

3. The method of claim 1, wherein the computing device further includes a media output device, said method further comprising:

displaying through the media output device a representation of the journaling-capable file system.

4. The method of claim 1, wherein the computing device further includes a media output device, said method further comprising:

displaying through the media output device a user interface representing the plurality of meta commands.

5. The method of claim 1, wherein the memory further comprises an application programming interface configured to perform operations on the journaling-capable file system, and wherein said executing the first plurality of standard journaling commands to perform at least one operation on the journaling-capable file system further comprises:

performing the at least one operation on the journaling-capable file system using the application programming interface.

6. The method of claim 1, wherein the memory further comprises a scripting engine configured to perform operations on the journaling-capable file system, and wherein said executing the first plurality of standard journaling commands to perform at least one operation on the journaling-capable file system further comprises:

performing the at least one operation on the journaling-capable file system using the scripting engine.

7. One or more non-transitory computer-readable storage media for managing a journaling-capable file system, the one or more non-transitory computer-readable storage media having computer-executable instructions embodied thereon, wherein when executed by at least one processor, the computer-executable instructions cause the processor to:

store, in a memory, each of a plurality of meta commands, the plurality of meta commands including:
i) a generate journal receiver meta command operable to cause the processor to execute a plurality of standard journaling commands to generate a new journal receiver;
ii) a delete journal receiver meta command operable to cause the processor to execute a plurality of standard journaling commands to delete an existing journal receiver;
iii) a generate journal meta command operable to cause the processor to execute a plurality of standard journaling commands to generate a new journal;
iv) a delete journal meta command operable to cause the processor to execute a plurality of standard journaling commands to delete an existing journal;
v) a query journal receiver meta command operable to cause the processor to execute a plurality of standard journaling commands to query a journal receiver;
vi) a display output meta command operable to cause the processor to execute a plurality of standard journaling commands to display an output based on a journal receiver;
vii) a stop journaling meta command operable to cause the processor to execute a plurality of standard journaling commands to stop journaling by a journal;
viii) a start journaling meta command operable to cause the processor to execute a plurality of standard journaling commands to start journaling by a journal;
ix) a display journal attributes meta command operable to cause the processor to execute a plurality of standard journaling commands to display information related to a journal; and
x) a display journal receiver attributes meta command operable to cause the processor to execute a plurality of standard journaling commands to display creation and current attributes of a journal receiver, the current attributes including one of a) the name of a journal that the journal receiver is currently attached to and b) the name of the journal the journal receiver was last attached to, along with the date and time that the journal receiver was detached from that journal;

receive a selection of a first meta command from the plurality of meta commands stored in the memory, wherein the first meta command corresponds to a first plurality of standard journaling commands;

convert the first meta command to the first plurality of standard journaling commands using an internal mapping schema, wherein the internal mapping schema maps at least one relationship between the first meta command and the first plurality of standard journaling commands, and wherein the first meta command pertains to at least one of a journal and a journal receiver, wherein the journal receiver is a file that contains the information that the associated journal is recording; and execute the first plurality of standard journaling commands on at least one of the journal and the journal receiver to perform at least one operation on a journaling-capable file system.

8. The non-transitory computer-readable storage media of claim 7, wherein the computer-executable instructions further cause the processor to receive an automated command wherein automation is based upon at least one of a set of conditional rules and a user-defined schedule.

9. The non-transitory computer-readable storage media of claim 7 wherein the computer-executable instructions further cause the processor to display through a media output device a representation of the journaling-capable file system.

10. The non-transitory computer-readable storage media of claim 7 wherein the computer-executable instructions further cause the processor to display through a media output device a user interface representing the plurality of meta commands.

11. The non-transitory computer-readable storage media of claim 7 wherein the computer-executable instructions further cause the processor to perform at least one operation on the journaling-capable file system using an application programming interface.

12. The non-transitory computer-readable storage media of claim 7 wherein the computer-executable instructions further cause the processor to perform at least one operation on the journaling-capable file system using a scripting engine.

13. A computer for managing a journaling-capable file system, said computer including a processor and a memory device coupled to said processor, said computer configured to:
  store, in the memory device, each of a plurality of meta commands, the plurality of meta commands including:
    i) a generate journal receiver meta command operable to cause the computer to execute a plurality of standard journaling commands to generate a new journal receiver;
    ii) a delete journal receiver meta command operable to cause the computer to execute a plurality of standard journaling commands to delete an existing journal receiver;
    iii) a generate journal meta command operable to cause the computer to execute a plurality of standard journaling commands to generate a new journal;
    iv) a delete journal meta command operable to cause the computer to execute a plurality of standard journaling commands to delete an existing journal;
    v) a query journal receiver meta command operable to cause the computing device to execute a plurality of standard journaling commands to query a journal receiver;
    vi) a display output meta command operable to cause the computer to execute a plurality of standard journaling commands to display an output based on a journal receiver;
    vii) a stop journaling meta command operable to cause the computer to execute a plurality of standard journaling commands to stop journaling by a journal;
    viii) a start journaling meta command operable to cause the computer to execute a plurality of standard journaling commands to start journaling by a journal;
    ix) a display journal attributes meta command operable to cause the computer to execute a plurality of standard journaling commands to display information related to a journal; an
    x) a display journal receiver attributes meta command operable to cause the computer to execute a plurality of standard journaling commands to display creation and current attributes of a journal receiver, the current attributes including one of a) the name of a journal that the journal receiver is currently attached to and b) the name of the journal the journal receiver was last attached to, along with the date and time that the journal receiver was detached from that journal;
  receive a selection of a first meta command from the plurality of meta commands stored in the memory device, wherein the first meta command corresponds to a first plurality of standard journaling commands;
  convert the first meta command to the first plurality of standard journaling commands using an internal mapping schema, wherein the internal mapping schema maps at least one relationship between the first meta command and the first plurality of standard journaling commands, and wherein the first meta command pertains to at least one of a journal and a journal receiver, wherein the journal receiver is a file that contains the information that the associated journal is recording; and
  execute the first plurality of standard journaling commands on at least one of the journal and the journal receiver to perform at least one operation on a journaling-capable file system.

14. The computer of claim 13, further configured to receive an automated command wherein automation is based upon at least one of a set of conditional rules and a user-defined schedule.

15. The computer of claim 13 further configured to display through a media output device a representation of the journaling-capable file system.

16. The computer of claim 13 further configured to display through a media output device a user interface representing the plurality of meta commands.

17. The computer of claim 13 further configured to perform at least one operation on the journaling-capable file system using an application programming interface.

* * * * *